May 8, 1951            H. HUBER            2,552,320
VEHICLE FRAME AND SPRING STRUCTURE
Filed April 12, 1946            2 Sheets—Sheet 1
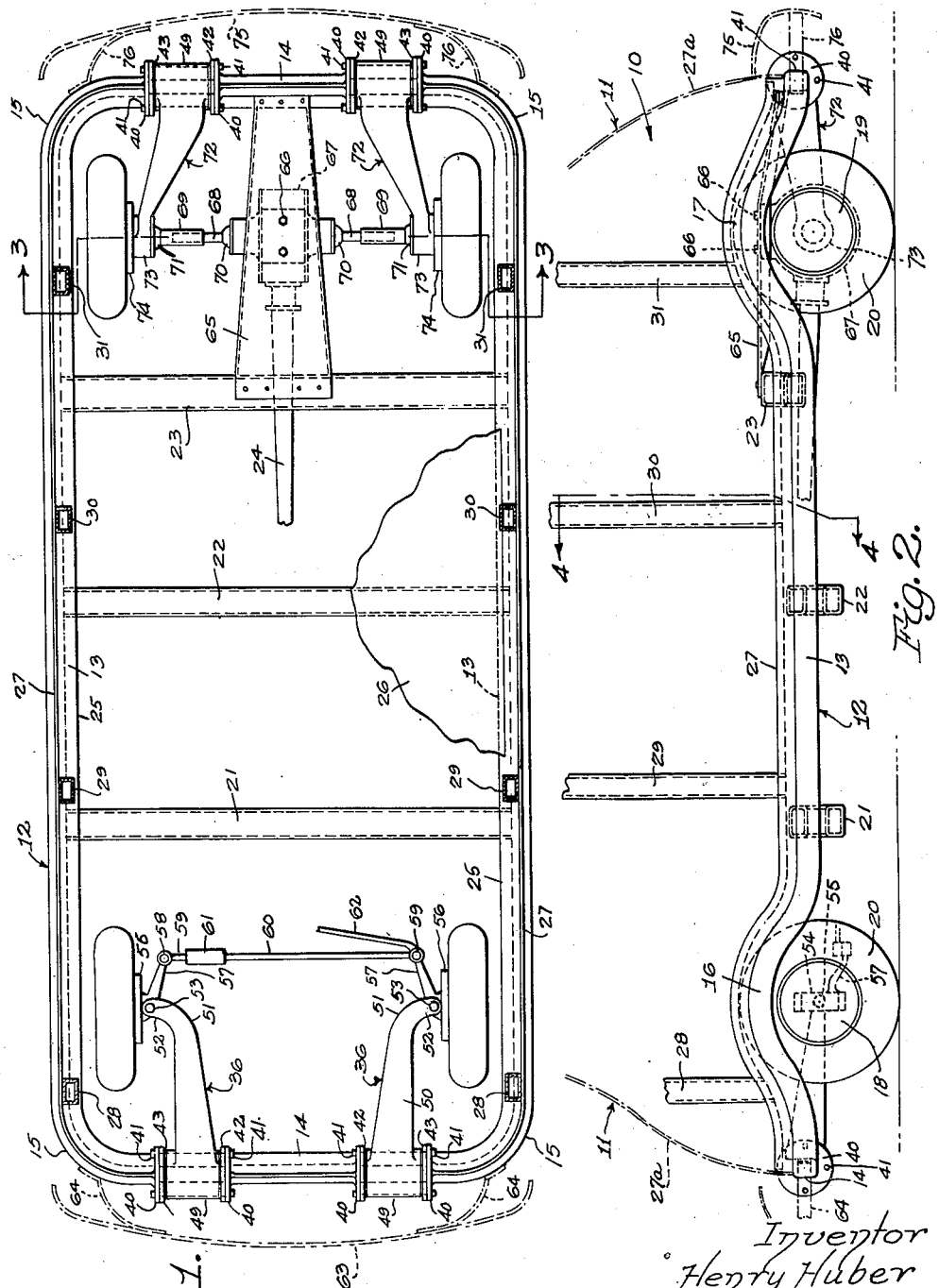
Inventor
Henry Huber
by Barthel & Bugbee
Att'ys May 8, 1951 H. HUBER 2,552,320
VEHICLE FRAME AND SPRING STRUCTURE
Filed April 12, 1946 2 Sheets-Sheet 2
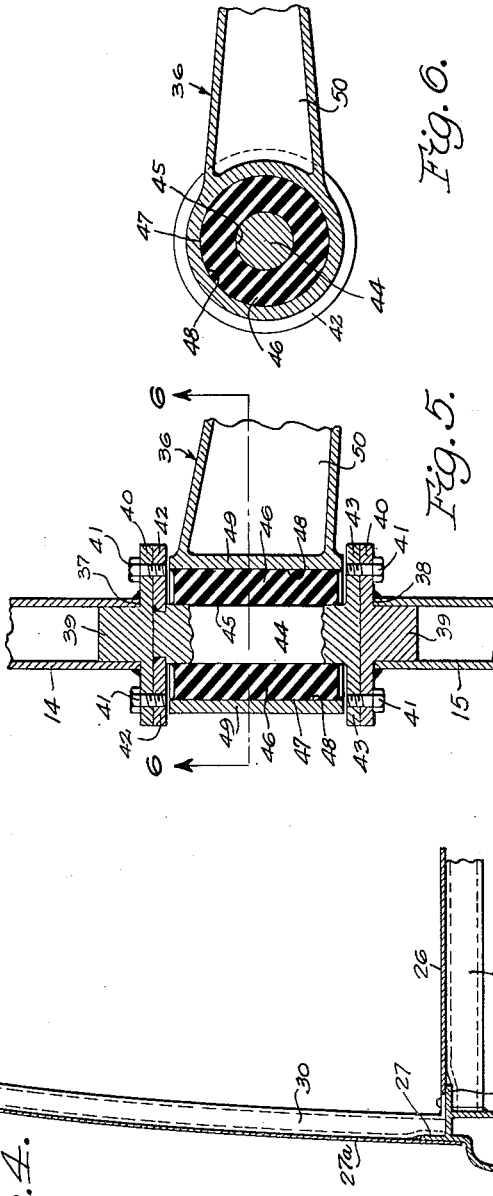
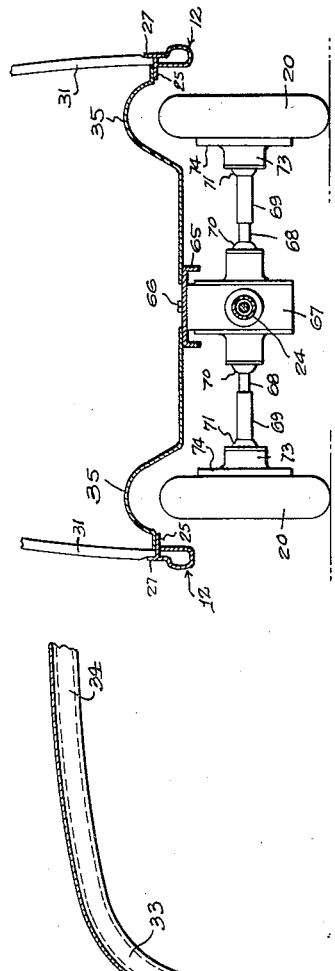
Inventor
Henry Huber
by Barthel & Bugbee
Att'ys Patented May 8, 1951

2,552,320

UNITED STATES PATENT OFFICE 2,552,320

VEHICLE FRAME AND SPRING STRUCTURE

Henry Huber, Clarkston, Mich.

Application April 12, 1946, Serial No. 661,835

6 Claims. (Cl. 280—106.5)

This invention relates to vehicles and in particular to frames and bodies therefor.

One object of this invention is to provide a vehicle having an orbital frame to which the body as well as the wheels and running gear are directly attached.

Another object is to provide a vehicle having an orbital frame extending entirely around the vehicle and outboard of the wheels, the body being attached directly to the orbital frame so that a greater width of body is available for passenger or freight transportation and a longer effective wheelbase is provided.

Another object is to provide a vehicle as set forth in the preceding objects wherein the combined body and frame construction saves weight yet increases the strength of the vehicle, imparts greater rigidity thereto, provides a simpler construction than heretofore, and enables an all-metallic construction to be employed.

Another object is to provide a vehicle as set forth in the preceding objects wherein the body itself, by being attached directly to the orbital frame, serves as a part of the frame structure of the vehicle and thereby increases the strength thereof for a given weight of vehicle, thus also enhancing the safety of the vehicle under conditions of severe service or in the event of an accident.

Another object is to provide a vehicle having an orbital frame to which the body is directly attached and which provides a simple and efficient means of mounting the wheels with independent springing thereof, the wheels being located entirely inside the orbital frame.

Another object is to provide a vehicle as set forth in the preceding objects wherein the orbital frame additionally serves as a bumper both at the sides and ends of the vehicle in the event of a collision.

Another object is to provide a vehicle as set forth in the preceding objects wherein the direct attachment of the body to the orbital frame and the mounting of the wheels entirely within the frame eliminate the need for fenders altogether.

Another object is to provide a vehicle as set forth in the preceding objects wherein the chassis as a separate unit is eliminated, the body and orbital frame comprising a single unit.

Another object is to provide a vehicle as set forth in the preceding objects, wherein a jack for raising or lowering the body may be applied to said orbital frame at substantially any location around the vehicle.

Other objects and advantages of the invention will become apparent during the course of the following description of the accompanying drawings, wherein:

Figure 1 is a top plan view, partly in horizontal section through the lower portion of a vehicle according to the present invention, with the flooring broken away to disclose the structure beneath it and with the wheels mounted for independent springing;

Figure 2 is a side elevation of the vehicle shown in Figure 1;

Figure 3 is a vertical section taken along the line 3—3 in Figure 1;

Figure 4 is a fragmentary vertical section taken along the line 4—4 in Figure 2;

Figure 5 is a fragmentary horizontal axial section through one of the independent wheel suspensions of Figure 1; and Figure 6 is a vertical section along the line 6—6 in Figure 5.

Referring to the drawings in detail, Figures 1 to 6 inclusive show the lower portion of a vehicle, generally designated 10, according to a preferred embodiment of the invention wherein the wheels are mounted for independent springing and wherein the body 11 is of unitary construction with an orbital frame unit 12. The latter, as its name implies, extends entirely around the vehicle and consists of substantially parallel side and end portions 13 and 14 respectively, connected by curved corner portions 15. The side portions 13 are provided with kick-up portions 16 and 17 at the forward and rearward portions thereof so as to permit access to the front and rear wheels 18 and 19 respectively, such as for changing the tires 20 thereof and other purposes.

The front and rear wheels 18 and 19 are wholly within the limits of the orbital frame unit 12 and are thus protected by it. The side portions 13 are interconnected by any suitable cross members 21, 22 and 23. The latter are shown as perpendicular to the side members 13 but obviously may include diagonal cross braces if desired, any system of cross bracing being capable of use with the orbital frame 12. The cross members 21, 22 and 23 may be arched, as shown in Figure 2, in order to provide for the passage of the propeller shaft 24, and may be of the tubular construction shown or of channel construction, as desired. The orbital frame unit 12 (Figure 4) is preferably of tubular construction so as to provide strength with lightness, and may be provided with an inwardly projecting flange 25 for the attachment of flooring 26, and also with a vertical flange 27 for the direct attachment of the body plating 27a.

The latter is strengthened at intervals by vertical members 28, 29, 30 and 31, preferably of channel construction and having flanged portions 32 for attachment to the flange 25 of the orbital frame unit 12. The upper portions of the vertical members 29 and 30 may be curved as at 33 to provide a horizontal connecting portion 34 extending across the vehicle immediately beneath the roof thereof. The flooring 26 may be kicked up as at 35 (Figure 3) to provide space for the up and down motion of the wheels 18 and 19.

The running gear of the vehicle, in addition to the wheels, includes front wheel suspension units, generally designated 36, may be of any suitable design, the particular design shown in the drawings being illustrated merely by way of example. For this purpose, the front frame portion 14 terminates at 37 and the corner portion at 38 (Figure 5), inserts 39 with flanges 40 being secured therein as by welding. The flanges 40 are bolted as at 41 to the flanges 42 and 43, the flange 43 being integral with a shaft 44 to which the flange 42 is secured, as by welding.

Bonded to the shaft 44 is the inner bore 45 of a resilient sleeve or bushing 46 of elastic deformable material, such as rubber, synthetic rubber or the like, the outer surface 47 of which is bonded to the walls of a bore 48 within the tubular hub 49 of the suspension unit 36. Integral with and extending transversely from the tubular hub 49 are arms 50 bent as at 51 and terminating in yoke portions 52 carrying king pins 53 upon which the steering knuckles 54 are pivotally mounted. The latter terminate in axle portions 55 extending through the front brake drums 56 and rotatably supporting the front wheels 18. The steering knuckles 54 are also provided with rearwardly extending arms 57 which are pivotally connected as at 58 to the tie rod portions 59 and 60 (Figure 1), having an equalizer device 61 to permit independent motion of the front wheels 18 in a vertical direction. The tie rod 60 is connected to the usual operating rod 62 which in turn is connected to the conventional steering wheel mechanism (not shown). The front wheel and steering mechanism are of conventional form and their details form no part of the present invention. A conventional bumper 63 is mounted at the forward end of the vehicle and secured to the corner portions 15 of the orbital frame unit 12 by arms 64.

The rearward end of the vehicle carries the rearward portion of the running gear of the vehicle and is provided with a longitudinal member 65 secured to and extending between the cross member 23 and the end portion 14 of the orbital frame unit 12. Secured as at 66 to the member 65 is the usual differential housing 67 into which the propeller shaft 24 passes and from which the rear axle portions 68 emerge. The latter telescope into rear axle portions 69, these being splined or otherwise drivingly interconnected. Universal joints 70 and 71 are provided for permitting independent up and down movement of the suspension units 72. The latter are generally similar in construction to the front suspension units 36 (Figures 5 and 6) except that at their free ends they are provided with tubular hubs 73 encircling the rear axle portions 69. The rear wheels 19 are provided with brake drums 74 and are rotatably mounted upon the suspension units 72 in a conventional manner. A rear bumper 75, generally similar to the front bumper 63, is mounted upon the rearward corner portions 15 by means of arms 76.

The details of the doors, windows, hood, windshield and so forth, form no part of the present invention and are of conventional design. It will be seen, however, that the body pillars or vertical members 28, 29, 30 and 31 and the body plating 27a are carried all the way out to the orbital frame side members 13 so that the front seat is greatly widened over that obtainable in a conventional type of vehicle and fenders can be eliminated. The body plating 27a, shown in Figure 4, has been omitted from the remaining figures either because of the small scale of the figures or for greater clarity in showing structure which would otherwise be concealed. The engine is conventional and is omitted for clearness of showing of the running gear of the vehicle 10.

While the orbital frame construction shown and described above has been illustrated in connection with a self-propelled vehicle, the construction is also well adapted to towed vehicles, such as trailers. The flooring 26 is preferably welded to the orbital frame unit 12 so as to form an integral portion of the vehicle, thereby adding to its strength of construction.

The operation of the vehicle is self-evident from the foregoing description and follows a conventional mode of operation. The orbital frame unit 12 with the body plating 27a and uprights or pillars 28, 29, 30 and 31 provides a greatly improved construction resulting in a lightening of weight, with an increase in strength. The necessity of providing a separate chassis and a separate body with the necessary framing is eliminated, according to the present invention, the body and frame being combined in a single strong and substantially integral unit.

While I have shown and described my invention in detail, it is to be understood that the same is to be limited only by the appended claims, for many changes may be made without departing from the spirit and scope of my invention.

What I claim is:

1. A vehicle chassis comprising a substantially rectangular frame having elongated substantially parallel side members and substantially parallel end members with curved corner portions at the junctions between said members, a pair of substantially rigid laterally spaced parallel front wheel supporting arms having hubs independently pivoted at their outer ends to the forward end member inwardly of said side members and extending rearwardly therefrom, resilient torque-resisting elements operatively connecting said hubs with said end member and yieldingly opposing pivotal motion thereof, a front wheel journaled on the rearward end of each of said arms independently of the other front wheel, steering mechanism operatively interconnecting said front wheels while permitting independent rise and fall thereof relatively to one another, resiliently mounted rear wheel suspensions connected to the rearward portion of said frame inwardly of said side members, and rear wheels mounted on said suspensions, said front and rear wheels being mounted wholly inside said frame.

2. A vehicle chassis comprising a substantially rectangular frame having elongated substantially parallel side members and substantially parallel end members with curved corner portions at the junctions between said members, a pair of substantially rigid laterally spaced parallel front wheel supporting arms having hubs independently pivoted at their outer ends to the forward end member inwardly of said side members and extending rearwardly therefrom, resilient torque-resisting elements of elastic deformable material operatively connecting said hubs with said end member and yieldingly opposing pivotal motion thereof, a front wheel journaled on the rearward end of each of said arms independently of the other front wheel, steering mechanism operatively interconnecting said front wheels while permitting independent rise and fall thereof relatively to one another, resiliently mounted rear wheel suspensions connected to the rearward portion of said frame inwardly of said side members, and rear wheels mounted on said suspensions, said front and rear wheels being mounted wholly inside said frame.

3. A vehicle chassis comprising a substantially rectangular frame having elongated substantially parallel side members and substantially parallel end members with curved corner portions at the junctions between said members, a pair of substantially rigid laterally spaced parallel front wheel supporting arms having hubs independently pivoted at their outer ends to the forward end member inwardly of said side members and extending rearwardly therefrom, a pair of substantially rigid laterally spaced parallel rear wheel supporting arms having hubs independently pivoted at their outer ends to the rearward end member inwardly of said side members and extending forwardly therefrom, resilient torque-resisting elements operatively connecting said hubs with their respective end members and yieldingly opposing pivotal motion thereof, a front wheel journaled on the rearward end of each of the forward arms independently of the other front wheel, steering mechanism operatively interconnecting said front wheels while permitting independent rise and fall thereof relatively to one another, and a rear wheel journaled on the forward end of each of the rearward arms independently of the other rear wheel, said front and rear wheels being mounted wholly inside said frame.

4. A vehicle chassis comprising a substantially rectangular frame having elongated substantially parallel side members and substantially parallel end members with curved corner portions at the junctions between said members, a pair of substantially rigid laterally spaced parallel front wheel supporting arms having hubs independently pivoted at their outer ends to the forward end member inwardly of said side members and extending rearwardly therefrom, a pair of substantially rigid laterally spaced parallel rear wheel supporting arms having hubs independently pivoted at their outer ends to the rearward end member inwardly of said side members and extending forwardly therefrom, resilient torque-resisting members of elastic deformable material operatively connecting said hubs with their respective end members and yieldingly opposing pivotal motion thereof, a front wheel journaled on the rearward end of each of the forward arms independently of the other front wheel, steering mechanism operatively interconnecting said front wheels while permitting independent rise and fall thereof relatively to one another, and a rear wheel journaled on the forward end of each of the rearward arms independently of the other rear wheel, said front and rear wheels being mounted wholly inside said frame.

5. A vehicle chassis comprising a substantially rectangular frame having elongated substantially parallel tubular side members and substantially parallel tubular end members with curved tubular corner portions at the junctions between said members, a pair of substantially rigid laterally spaced parallel front wheel supporting arms having hubs independently pivoted at their outer ends to the forward end member inwardly of said side members and extending rearwardly therefrom, resilient torque-resisting elements operatively connecting said hubs with said end member and yielding opposing pivotal motion thereof, a front wheel journaled on the rearward end of each of said arms independently of the other front wheel, steering mechanism operatively interconnecting said front wheels while permitting independent rise and fall thereof relatively to one another, resiliently mounted rear wheel suspensions connected to the rearward portion of said frame inwardly of said side members, and rear wheels mounted on said suspension, said front and rear wheels being mounted wholly inside said frame.

6. A vehicle chassis comprising a substantially rectangular frame having elongated substantially parallel tubular side members and substantially parallel tubular end members with curved tubular corner portions at the junctions between said members, a pair of substantially rigid laterally spaced parallel front wheel supporting arms having hubs independently pivoted at their outer ends to the forward end member inwardly of said side members and extending rearwardly therefrom, a pair of substantially rigid laterally spaced parallel rear wheel supporting arms having hubs independently pivoted at their outer ends to the rearward end member inwardly of said side members and extending forwardly therefrom, resilient torque-resisting elements operatively connecting said hubs with their respective end members and yieldingly opposing pivotal motion thereof, a front wheel journaled on the rearward end of each of the forward arms independently of the other front wheel, steering mechanism operatively interconnecting said front wheels while permitting independent rise and fall thereof relatively to one another, and a rear wheel journaled on the forward end of each of the rearward arms independently of the other rear wheel, said front and rear wheels being mounted wholly inside said frame.

HENRY HUBER.

REFERENCES CITED

The following references are of record in the file of this patent:

UNITED STATES PATENTS

| Number | Name | Date |
|---|---|---|
| 761,690 | Martell et al. | June 7, 1904 |
| 1,171,942 | Goodwin | Feb. 15, 1916 |
| 1,252,759 | Wilson | Jan. 8, 1918 |
| 1,584,723 | Booth | May 18, 1926 |
| 1,793,680 | Cooke | Feb. 24, 1931 |
| 1,846,464 | Andren | Feb. 23, 1932 |
| 1,938,142 | Hallenbeck | Dec. 5, 1933 |
| 1,993,260 | Burns | Mar. 5, 1935 |
| 2,122,444 | Tjaarda | July 5, 1938 |
| 2,122,445 | Tjaarda | July 5, 1938 |
| 2,157,649 | Eksergian | May 9, 1939 |
| 2,165,033 | Dauben | July 4, 1939 |
| 2,286,609 | Ledwinka | June 16, 1942 |
| 2,312,052 | Premo | Feb. 23, 1943 |
| 2,330,482 | Fageol | Sept. 28, 1943 |
| 2,354,700 | Pezzano | Aug. 1, 1944 |

FOREIGN PATENTS

| Number | Country | Date |
|---|---|---|
| 377,268 | Great Britain | July 20, 1932 |
| 378,481 | Great Britain | Aug. 15, 1932 |